US004001689B2

United States Statutory Invention Registration [19]

[11] Reg. Number: H1689

Foucher

[45] Published: Nov. 4, 1997

[54] WRENCH HEAD FOR APPLYING HIGH TORQUE IN LIMITED SPACE AND METHOD OF CONSTRUCTION

[75] Inventor: Nelson H. Foucher, Ridgecrest, Calif.

[73] Assignee: The United States of America as represented by the Secretary of the Navy, Washington, D.C.

[21] Appl. No.: 565,432

[22] Filed: Nov. 30, 1995

[51] Int. Cl.[6] ..... B25B 13/08

[52] U.S. Cl. ..... 81/124.3; 81/124.2; 81/124.7

[58] Field of Search ..... 81/119, 121.1, 81/124.2, 124.3, 124.7, DIG. 7; 76/119, 101.1, 114

[56] References Cited

U.S. PATENT DOCUMENTS

| | | | |
|---|---|---|---|
| 1,224,875 | 5/1917 | Zarth | 81/DIG. 7 X |
| 2,691,912 | 10/1954 | Jones | 81/124.2 |
| 2,715,347 | 8/1955 | Johnson | 81/124.2 |
| 2,716,367 | 8/1955 | Montgomery | 81/124.3 |
| 2,800,816 | 7/1957 | Tasciotti | 81/124.2 |
| 5,230,263 | 7/1993 | Kwaka | 81/124.3 X |

FOREIGN PATENT DOCUMENTS

| | | | |
|---|---|---|---|
| 126548 | 1/1932 | Austria | 81/124.2 |

*Primary Examiner*—Michael J. Carone
*Attorney, Agent, or Firm*—Stephen J. Church; Melvin J. Sliwka

[57] ABSTRACT

A wrench head or the like device for applying torque about an axis to a bolt head or the like element from which there extends axially a member such as a tube or cable. The device has a pair of jaws spaced and configured so as to oppositely engage the element and provide a gap between distal ends of the jaws. The jaws have axially opposite regions, and the device is characterized by a reinforcement extending across and fixed to an axially aligned pair of these regions. The reinforcement terminates at the radially outward sides of the jaws and is relatively thin axially so that the device is receivable in a space limited axially and radially of the element. The reinforcement has a opening extending radially from the gap for passage of the member to align the device axially with the element. The device is further characterized by the width of the opening being substantially less than the space between the jaws so that the reinforcement minimizes bending of the jaws when applying a relatively high torque to the element. One form of the device may be constructed by welding a disk to one side of a conventional box end wrench and then cutting the gap and the opening through the wrench and the disk.

15 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

WRENCH HEAD FOR APPLYING HIGH TORQUE IN LIMITED SPACE AND METHOD OF CONSTRUCTION

BACKGROUND OF THE INVENTION

1. Field of the Invention

The present invention pertains to wrenches and, more particularly, pertains to a wrench having a radially slotted head adapted to apply a high torque and yet receivable in an axially and radially limited space.

2. Description of the Related Art

It is well known to provide a wrench head or similar device with a slot opening radially of a rotatable bolt or nut element engageable by the device for application of torque so that tubing or wiring extending axially of the element may pass through the slot to allow engagement of the device head with the rotatable element. Several such slotted prior art devices are shown in the accompanying Figures.

It is apparent that a rotatable element engaging jaw or the like of such a slotted device is necessarily more flexible than a corresponding jaw of a similar device lacking such a slot but with otherwise similar dimensions. Such a slotted device is thus prone to distort and slip from an engaged rotatable element when torque is applied. This deficiency has been minimized by increasing the amount of material where bending occurs in such a jaw, but this typically requires increasing the exterior dimensions of the device so that it may be too large for reception in the often cramped space available adjacent to such rotatable elements in apparatus having portions connected thereby. As a result, such prior art slotted devices are effective only where either relatively limited torque is to be applied or where sufficient space is available, both radially and axially, for reception of a relatively large such device in engaging relation with the rotatable dement.

BRIEF SUMMARY OF THE INVENTION

The present invention is a wrench head or the like device for applying torque to a rotatable element, such as a bolt head, from an end of which there extends axially a member such as a tube or cable. The device is constructed so as to apply a relatively high torque and yet be receivable, for positioning to engage the element, in a space which is adjacent to the element and is limited axially and radially of the element. The device resembles prior art tubing wrenches and the like in having a base adapted for driving the device in any suitable manner, as by a squared socket driver, and in having a pair of jaws extending in spaced relation from the base to distal ends. The distal ends define between them an gap for passage of the device, in a direction radially of the element, over such an axially extending member so as to align the jaws axially with the element for engagement of the jaws with the element by such radial movement or by subsequent axial movement of the device toward the element. The jaws have inwardly facing surfaces conforming to the element for oppositely and radially engaging the element in torque transmitting relation. These facing surfaces may have any suitable configuration, such as planar for such a device similar to an open end wrench, or arcuate and having angularly spaced protuberances for such a device similar to a socket wrench. The jaws also have pairs of axially and oppositely facing sides, and one pair of these sides is, typically, aligned with such end of the element when the device is engage therewith.

A device embodying the present invention is characterized by a reinforcement extending across and fixed to a region corresponding to the other pair of such axially facing sides of the jaws. The reinforcement terminates at the radially outward sides of the jaws so that the device is no larger radially than the jaws. Axially of the element, the reinforcement is, typically, planar and relatively thin so that the device is not greatly thicker than the jaws. The device is thus receivable in a space limited axially and radially of the element. The reinforcement is provided with an opening extending axially from and aligned with the gap between the jaws. The opening extends radially inwardly from this gap so that such axially extended member may pass through the opening when the device is being aligned axially with the element. The device is further characterized by the width of the opening being substantially less than the distance between the facing surfaces of the opening so that the reinforcement forms ribs extending inwardly from the racing surfaces of the jaws to minimize bending and other distortion of the jaws when applying a relatively high torque to the element.

The reinforcement is, preferably, of unitary construction with the jaws, and such a device may be constructed by welding an annular disk to one side of a conventional box end wrench and then cutting the gap through one side of the "box" and cutting the opening from the gap to center of the disk.

BRIEF DESCRIPTION OF THE SEVERAL VIEWS OF THE DRAWING

The above and other objects, advantages, and novel features of the present invention will be apparent from the following detailed description when considered with the accompanying drawings in which.

DETAILED DESCRIPTION

First Embodiment and Prior Art Deficiencies

Figure 1:
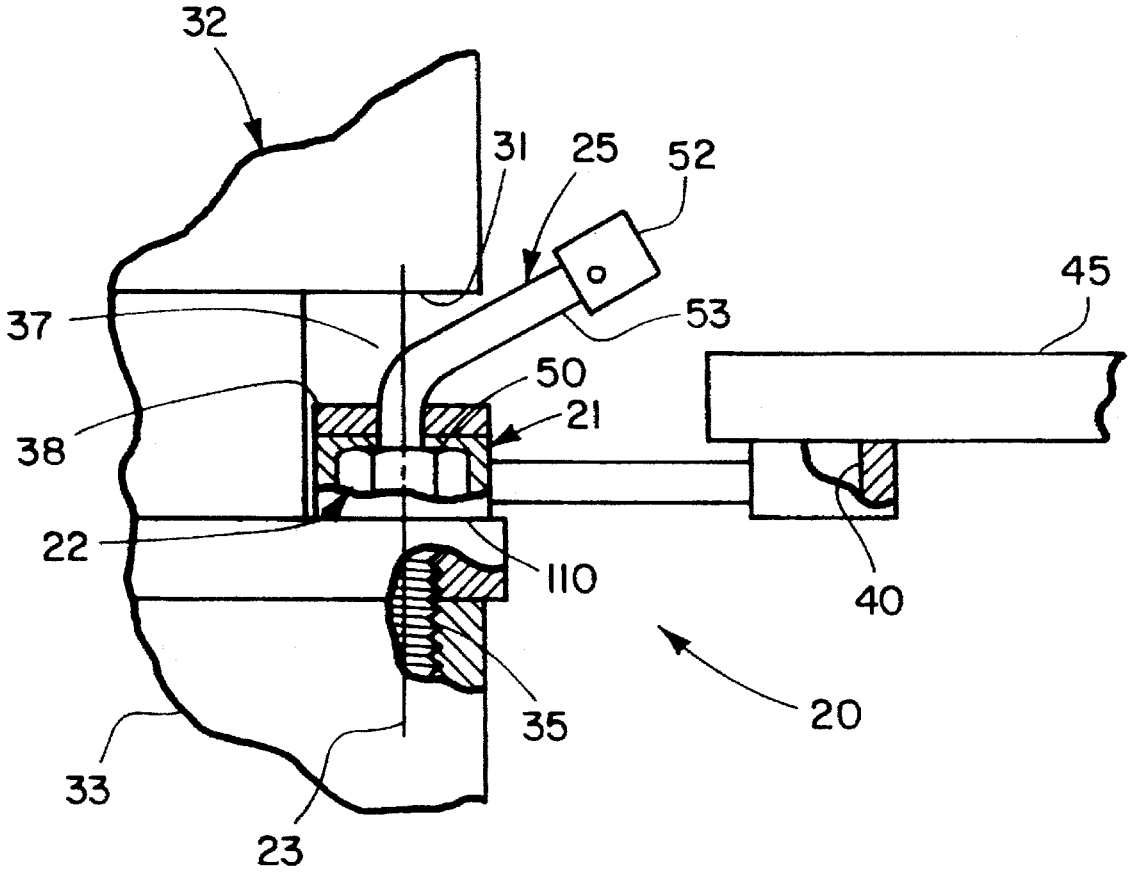
FIG. 1 is a radial view of a first wrench head for applying high torque and embodying the principles of the present invention, the wrench head being depicted in a typical operating environment for the wrench head as utilized with typical driving equipment and in a fragmentarily represented apparatus where space for the wrench head is limited both axially and radially.

FIG. 1 shows a wrench 20 including a reinforced wrench head 21 which is a first embodiment of the present invention.

The wrench is depicted in a representative operating environment wherein the wrench head is engaged with a conventional bolt head 22 to apply a torque to the bolt head about an axis 23 of the bolt head. The bolt head is associated with an cable 25 extending generally axially from the bolt head. The wrench head, bolt head, and cable are located in a recess 31 of a fragmentarily represented and representative machine part 32 that is to be secured to another such part 33 by a threaded portion 35 of a bolt bearing the bolt head. The dimensions and configuration of recess 31 are such that space for access to the bolt head is limited axially as indicated at arrow 37 and radially as indicated at arrow 38.

In the following description of wrench heads and the like devices, both of the present invention as shown in FIGS. 1 and 7–12, and of the prior art as shown in FIGS. 2–6, rotatable elements, typified by bolt head 22, engaged in torque applying relation by the devices are assumed to have the common hexagonally prismatic configuration; however, it will be apparent to one skilled in the art that the principles of present invention may be used with other configurations of such rotatable elements. Also, the terms "axial" and "radial" are applied to the devices in relation to the position of an axes of such rotatable elements when engaged by the devices.

Additionally, the described devices are shown as being constructed, as is the FIG. 1 device, with a square socket 40 for reception of a conventional squared socket driver as is commonly provided with a torque wrench such as that schematically and fragmentarily represented in FIG. 1 and there indicated by numeral 45. However, it will be further apparent that devices embodying the present invention may have torque applied thereto in any suitable manner, including a simple handle, known in the prior art.

The prior art and present invention devices are constructed for use with a bolt head, nut, or the like rotatable element from which an member—such that identified by numeral 25 and which is, for typical examples, an electrical cable, tube, or stud—extends axially from an end of the element, such as the end 50 of bolt head 22. Such a member blocks access to the rotatable element by a conventional socket wrench, and, as is often the case, by a conventional box end wrench where the end of such a tube is not accessible. A similar problem is shown in FIG. 1 where an electrical connector 52 at the end of cable 25 has a width greater than interior of a socket fitting the bolt head 22 although a wire portion 53 of the cable is smaller in diameter. The solution is, of course, to provide a slot or opening for passage of the bolt head itself, as in the usual open end wrench illustrated in FIG. 2, or for passage of just the blocking member as with the devices of FIGS. 3–6.

Figure 7:
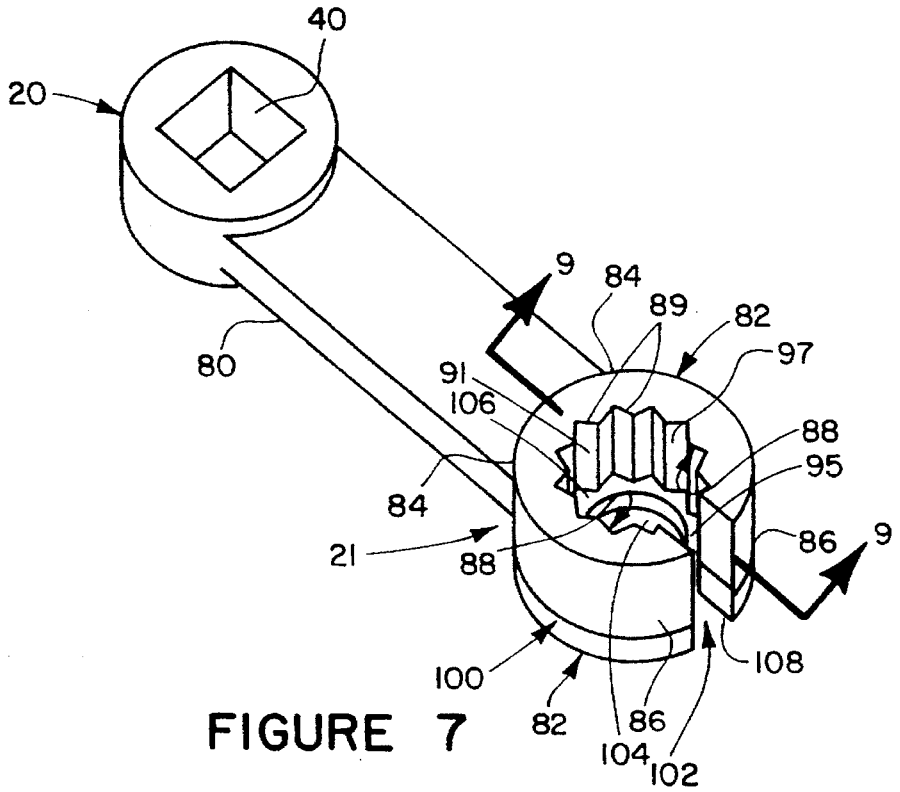
FIG. 7 is a perspective view of a wrench including the wrench head of FIG. 1.
Figure 8:
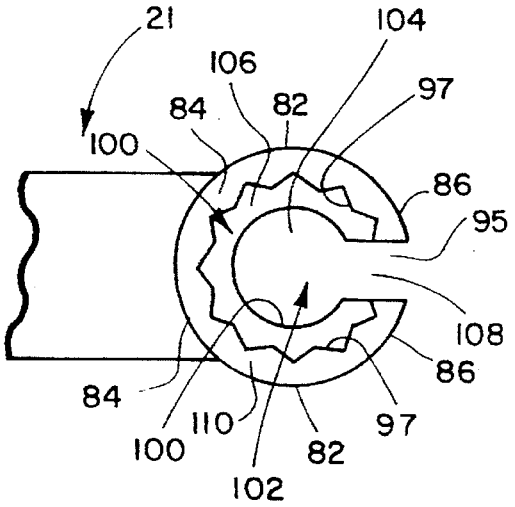
FIG. 8 is an axial view of the wrench head of FIG. 1.
Figure 11:
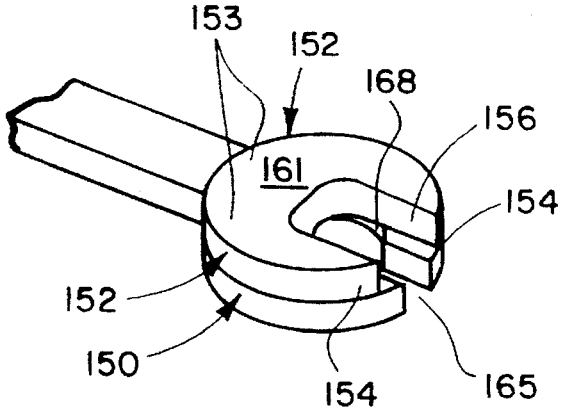
FIG. 11 is a perspective view of a second wrench head embodying the principles of the present invention.

This solution is also employed with devices embodying the present invention as best shown by FIGS. 7 and 11. However, devices of the present invention do not have either of the above alluded to two deficiencies of the prior art. First, that some prior art devices are distorted to unusability by application of relatively higher torques which cause no problem with conventional socket or box end wrenches. And, second, that other prior art devices stiff enough withstand such relatively high torques have additions of material that increase the exterior dimensions of such devices so that they are not receivable in the limited spaces, such as recess 31, containing rotatable elements, such as bolt head 22, from which members, such as cable 25, extend.

These deficiencies will now be discussed in relation to particular prior art devices that were utilized in an attempt to find a suitable device for the use described below in connection with the Example.

Figure 2:
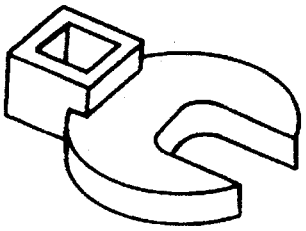
FIGURE 2 PRIOR ART
FIG. 2 is perspective view of a first prior art device which is for applying torque to a bolt head or the like and which is slotted radially thereof.

FIG. 2 shows a conventional "crow's foot" wrench having a head with a conventional open end and thus prone to open further under application of torque so as to distort with slippage and damage to the comers of prismatic elements to which the wrench is applied.

Figure 3:
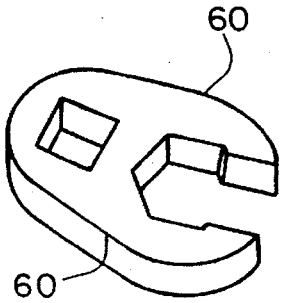
FIGURE 3 PRIOR ART
FIG. 3 is a perspective view of a second such prior art device.

FIG. 3 shows a wrench similar to that of FIG. 2, but having a hexagonal socket and stiffened by outwardly bulging reinforcements 60 that limit rotation of the FIG. 3 wrench when constrained radially as indicated by arrow 38 in FIG. 1.

Figure 4:
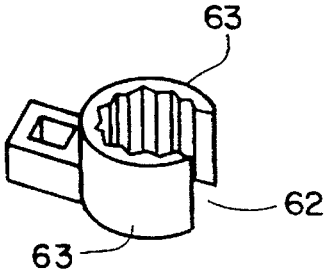
FIGURE 4 PRIOR ART
FIG. 4 is a perspective view of a third such prior art device.

FIG. 4 shows a conventional "tubing wrench" which is of box end form, but provided with a slot 62 for passage of a tube extending, like cable portion 53, from a rotatable element. The slot divides the usual circular box end into rotatable element engaging jaws 63 that distort when applying torque with resultant slippage and damage to the corners of prismatic elements to which the wrench is applied.

Figure 5:
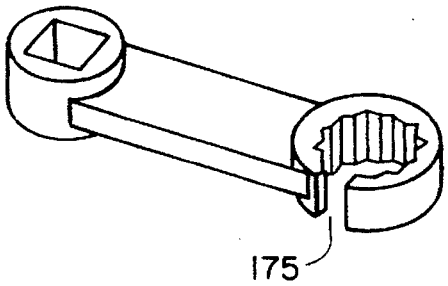
FIGURE 5 PRIOR ART
FIG. 5 is a perspective view of a fourth such prior art device.

FIG. 5 shows another form of prior wrench which is like the FIG. 4 wrench in having a slotted box end and in having the same problem with distortion when applying torque.

Figure 6:
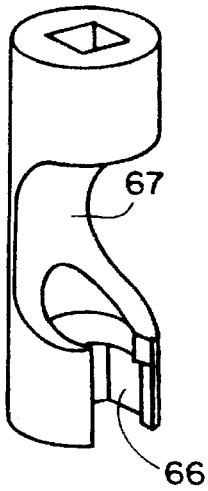
FIGURE 6 PRIOR ART
FIG. 6 is a perspective view of a fifth such prior art device.

FIG. 6 shows a conventional "tubing socket" having a slotted socket 66 at one end and a shank 67 extending axially from the socket at the side thereof opposite the slot. The socket has substantial depth axially so that it does not distort as do the FIGS. 4 and 5 wrenches. However, the FIG. 6 device is only usable with tubing or cables having the curved shape of cable 25 in FIG. 1, and the axial length of the FIG. 6 device prohibits its use in an axially limited space like the FIG. 1 recess 31.

Wrench head 21 will now be described in greater detail with reference to FIGS. 1 and 7–9. Wrench 20 includes a bar 80 extended from square socket 40 to wrench head 21, and it is apparent that the bar and socket form a base structure for applying torque to a pair of arcuate arms or jaws 82 extending from individual first ends or proximal ends 84 of the arms joined with the base structure to individual second or distal ends 86 of the arms. Jaws 82 are disposed in spaced relation and bear concave, facing surfaces 88 bearing conventional angularly spaced protuberances 89 conforming to a prismatic element such as bolt head 22 for radially opposite engagement of the element. Jaws 82 thus define between them a generally circular space or volume 91 conforming to such an element.

Distal ends 86 are spaced a predetermined distance so as to define between them a space 95 for passage of an elongated member, such as cable 25, extending axially from the bolt head 22 into volume 91 so that wrench head 21 may be aligned axially of the bolt head while spaced somewhat axially therefrom. The wrench head may then be moved axially toward the bolt head to engage jaws 82 therewith for application of torque thereto. It is evident that the portions 97 of surfaces 88 borne by arms 82 outwardly from their proximal ends to and including their distal ends are torque applying surfaces everywhere spaced a distance at least the predetermined distance between distal ends 86.

Wrench head 21 has a reinforcement 100 extending across and fixed to each of the jaws 82 to reduce distortion of the jaws due to application of torque thereby. The reinforcement of wrench head 21 defines a keyhole shaped opening 102, best shown in FIG. 8, extending from between distal ends 86 toward proximal ends 84. Opening 102 is thus disposed for passage of an elongated member, such as cable 25, so that wrench head 21 may be moved across an axis, such as axis 23, for aligning the wrench head axially of the bolt head while the wrench head is spaced somewhat axially from the bolt head. Opening 102 has a circular portion 104 which is coaxially related to the generally circular space 91 between jaws 82. However, circular portion 104 is substantially smaller in diameter than space 91 so that the reinforcement forms a rib 106 extending radially outward of circular portion 104 to the jaws. It is evident that as a result of the coaxial relation between the smaller diameter circular portion and the larger diameter space 91, the opening 102 has a width that, in a direction between the concave engaging surfaces 88, is everywhere less than the width of the space 91. Opening 102 also has a slot or slot portion 108 from opening circular portion 104 to space 95 between jaw distal ends 86 for passage of an elongated member, such as cable 25, into circular portion 104 in aligning wrench head 21 axially with the bolt head. It is apparent that, in a direction between engaging surfaces 88, opening 102 is disposed centrally between these surfaces 88 and has everywhere a width no greater than the distance between these surfaces.

Figure 9:
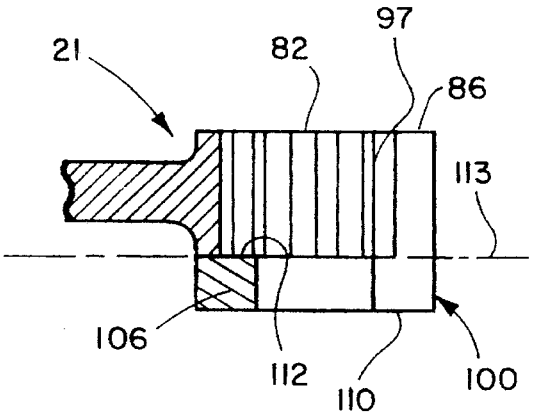
FIG. 9 is an section of the wrench head of FIG. 1 taken from the position of line 9—9 of FIG. 7.

Jaws 82, which bear torque applying surfaces 88, have sides 110 disposed at and thus just intersected by a first plane, not otherwise indicated. It is apparent, that, when a rotatable element such as prismatic bolt head 22 is fully engaged between the jaws, this plane faces axially of the bolt head and that the bolt head end from which cable 25 extends is then juxtapositioned to a planar surface 112 of rib 106 and reinforcement 100. Surface 112 faces space 91 and the jaw sides 110, and a second plane 113 aligned with surface 112 is indicated in FIG. 9 by a dot-dash line. Plane 113 is parallel to and may be considered as defining a region parallel to sides 110 at which region the reinforcement and sides of the jaws opposite their sides 110 are joined. Reinforcement 100 is thus generally planar and disposed oppositely of this second plane from the first plane. It is evident that the reinforcement extends across each of the jaws oppositely of its side 110 and across bolt head 22. It is evident that the reinforcement thus extends from each of the surfaces 88 toward the other of the surfaces 88 so as to form rib 106 extending at the second plane 113 from the surface 88 toward opening 102 which, because of its circular portion 104, is substantially circular at the second plane.

Method of Making First Embodiment

Figure 10:
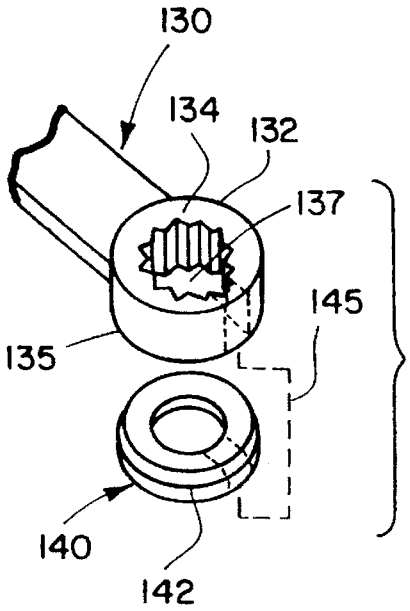
FIG. 10 is an exploded view showing a method of constructing a wrench head like that of FIG. 1.

Wrench head 21, together with the balance of wrench 20, may be constructed in any suitable manner as by forging reinforcement 100 and jaws 82 in the same operation. However, a wrench embodying the present invention may have a wrench head like wrench head 21 advantageously constructed as shown in FIG. 10 by obtaining a conventional wrench box end 130 with the usual annulus 132, sometimes termed first annulus. This annulus has axially opposite and substantially planar and parallel sides 134 and 135 and, centrally, defines a socket 137 configured for engagement with a prismatic element, such as bolt head 22. It is apparent that sides 134 and 135 correspond, respectively, to the above-described surface 110 and plane 113.

A second annulus 140, which has about the same outside diameter as annulus 132 and has an inside diameter required for the circular portion 104 of the opening 102 of the completed wrench head, is formed in any suitable manner. It is evident that this inside diameter is less than the least width or diameter of socket 137 in a direction along a diameter of annulus 132.

Annuli 132 and 140 are then juxtapositioned with first annulus side 135 engaged to on side of the second annulus and with the annuli in coaxial relation. The engaged sides of the annuli are then fixedly connected, preferably by welding entirely around the circumference of the second annulus at the engaged sides, and the second annulus may be provided with a chamfer 142 to receive the weld bead.

Finally, an opening, which forms space 95 and slot portion 108 of the completed wrench head 21, is then cut through the now connected annuli 132 and 140 at the positions 145 indicated thereon by dashed lines in FIG. 10.

If required, the annulus 132 may be annealed before being welded to annulus 140 and the completed wrench head appropriately heat treated when construction is complete.

Second Embodiment

Figure 12:
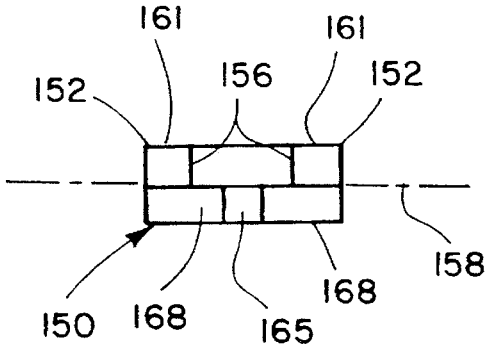
FIG. 12 is an end view of the wrench head of FIG. 11.

FIGS. 11 and 12 show a wrench head which is a second embodiment of the present invention and is usable in an operating environment similar to that depicted in FIG. 1. The second embodiment may be constructed similarly to wrench head 21 by welding a planar, U-shaped, reinforcement 150 to a conventional open end wrench head. The second embodiment is like the first in having a pair of arms or jaws 152 joined at proximal ends 153 for application of torque and extending to distal ends 154 spaced a predetermined distance. Jaws 152 have facing parallel surfaces 156 spaced this predetermined distance so as to conform in torque applying relation to opposite sides of a rotatable prismatic element exemplified by bolt head 22. Surfaces 156 are thus spaced a constant width at a plane or region 158 which, when the jaws are engaged with such an element, is disposed at the end of such an element from which a member, such as cable 25, extends axially elongated. Plane 158 thus corresponds to plane 113 and extends along sides of jaws 152 disposed oppositely of the jaws from sides 161 thereof which face axially of such a prismatic element when the jaws are engaged therewith.

Reinforcement 150 extends across jaws 152 at the region 158 and is fixed to the jaws thereat so as to reduce distortion of the jaws due to application of torque thereby. The reinforcement extends across surfaces 156 and from proximal ends 153 to distal ends 154. The reinforcement defines an opening 165 which extends between these ends, opens between the distal ends, is disposed centrally between torque applying surfaces 156, and has everywhere the same width which is less than the distance between surfaces so that the reinforcement forms at each jaw and between the proximal ends a rib 168 extending along region 158 and from each torque applying surface to the opening 165.

It is apparent that the second embodiment wrench head is engagable with a rotatable, prismatic element, such as bolt head 22, by movement of the wrench head radially across the element and that, when the wrench head is so moved, a member, such as cable 25, extending axially from an end of the element may pass through opening 165 for alignment of the wrench head axially with the element preparatory to application of torque thereto.

EXAMPLE

A wrench was required to apply 220 inch-pounds of torque to an explosive bolt having a nominal 9/16 inch hexagonal head from which a firing cable like cable 25 extended and prevented the use of a conventional socket or open end wrench. The bolt was disposed in a missile having an environment like that shown in FIG. 1 and so limited radially and axially that, although prior art wrenches like those of FIGS. 3 and 6 were obtained, these wrenches could not be used. Therefore, prior art wrenches like those of FIGS. 2 and 4 were obtained since these later wrenches were receivable in the axially and radially limited environment. However, these later wrenches distorted and slipped on the bolt head before the required torque could be applied.

A wrench like that of FIG. 5 was constructed by modifying a conventional torque adapter having a box end with a nominal 9/16 inch socket and an outside diameter of about 13/16 inch by a cutting a slot 175 about 3/16 wide into the socket. This modified torque adapter was receivable in the limited environment, but distorted and slipped when a torque of only 175–180 inch-pounds was applied.

A wrench, which was like wrench 20 shown in FIG. 7 and which embodied the present invention by the inclusion of a wrench head like wrench head 21, was constructed by the above described method from a torque adapter having the dimensions set forth in the preceding paragraph by welding to the torque adapter an annulus corresponding to annulus 140. This annulus was formed of chromium-molybdenum 4140 steel annealed and cold drawn and had a thickness of 0.175 inch and outer and inner diameters of, respectively 0.802 and 0.406 inch. An opening having a width of 0.200 inch was cut at the position 145.

This wrench head so configured and constructed in accordance with the present invention was found easily receivable in the axially and radially limited environment for engagement of the 9/16 inch explosive bolt head, and this wrench head of the present invention applied to the bolt head the required torque of 220 inch-pounds without slippage. However, this wrench head was found to apply the surprisingly high torque of at least 690 inch-pounds without failure.

Obviously, many modifications and variations of the present invention are possible in light of the above teachings. It is, therefore, to be understood that the invention may be practiced within the scope of the following claims other than as specifically described above.

What is claimed is:

1. A device for application of torque to a rotatable element about an axis of the rotatable element, the rotatable element being associated with a member extending from the rotatable element along the axis; and the device comprising:

a base having means for applying torque to the device;

a pair of jaws extending from the base and terminating in distal ends, said jaws being disposed in spaced relation and configured to define between said jaws a volume conforming to the rotatable element so that, by movement of the device toward the rotatable element, said jaws are engagable with the rotatable element for such application of torque, and said distal ends defining between them a space for passage of said member into said volume to align the device axially with the element preparatory to such application of torque; and a reinforcement extending across said jaws and fixed to each of said jaws so as to reduce distortion of said jaws due to such application of torque, said reinforcement defining an opening extending from between said distal ends for passage of said member through said opening to align the device axially with the element preparatory to such application of torque.

2. The device of claim 1 wherein:

each of said jaws has a side facing axially of the rotatable element when the device is engaged with the element for such application of torque; and said reinforcement extends across each of said jaws oppositely of said side.

3. The device of claim 2 wherein, in a direction between said jaws, said jaws are spaced substantially a constant distance equal to the space between said distal ends of the jaws and wherein said opening is disposed between said jaws and the width of said opening in said direction is less than said constant distance so that said reinforcement includes a rib extending from said opening to each of said jaws.

4. The device of claim 2 wherein said space between said jaws is generally circular and said opening has a circular portion coaxially related to said space, the diameter of said circular portion being less than the diameter of said space so that said reinforcement includes a rib extending radially outward of said circular portion to said jaws.

5. A wrench head comprising:

a pair of jaws having facing torque applying surfaces, said jaws having first ends joined for application of torque to said jaws and having second ends spaced a predetermined distance, said torque applying surfaces being everywhere spaced a distance at least said predetermined distance; and a reinforcement fixed to said jaws to minimize distortion of said jaws when torque is applied by said surfaces, said reinforcement extending across said torque applying surfaces and from said first ends to said second ends, and said reinforcement defining an opening between said second ends and extending from said second ends toward said first ends, said opening having a width that, in a direction between said surfaces, is everywhere less than the distance between said jaws.

6. The wrench head of claim 5 wherein a said jaws and said torque applying surfaces are intersected by a first plane, wherein said jaws have regions disposed at a second plane parallel to said first plane, and wherein said reinforcement is generally planar and is disposed oppositely of said second plane from said first plane.

7. The wrench head of claim 6 wherein at each of said jaws, said reinforcement extends from each of said torque applying surfaces toward the other of said torque applying surfaces so as to form a rib extending at said second plane from the torque applying surface to said opening.

8. The wrench head of claim 7 wherein said torque applying surfaces are substantially parallel and said opening has substantially a constant width at said second plane.

9. The wrench head of claim 7 wherein said torque applying surfaces are generally arcuate and concave and said opening is substantially circular at said second plane.

10. In a wrench head configured to be engaged with a prismatic element for application of torque to the prismatic element about a predetermined axis wherein the prismatic element has an end from which an elongated element extends along the axis and wherein the wrench head has a region disposed at the end of the prismatic element when the wrench head is so engaged with said prismatic element, the improvement comprising a reinforcement extended across and fixed to said region, the reinforcement extending across said end when the wrench head is so engaged and the reinforcement defining an opening for passage of the elongated element when the wrench head is moved across said axis for such engagement.

11. The wrench head of claim 10 wherein the wrench head bears a pair of substantially planar surfaces disposed in parallel and facing relation for opposite engagement of the prismatic element and wherein the reinforcement extends across said surfaces in a direction between said surfaces, and wherein, in a direction between said surfaces, said opening is disposed centrally between said surfaces and has a width less than the distance between said surfaces.

12. The wrench head of claim 10 wherein the wrench head bears a pair of concave surfaces disposed in facing relation and bearing angularly spaced protuberances for opposite engagement of the prismatic element and wherein the reinforcement extends across said surfaces in a direction between said surfaces, and wherein, in a direction between said surfaces, said opening is disposed centrally between said surfaces and has everywhere a width less than the distance between said surfaces.

13. The wrench head of claim 12 wherein said concave surfaces are disposed on corresponding arcuate arms terminating at distal ends spaced for such passage of the elongated element and the reinforcement defines a slot extending from between said distal ends to said opening for passage of the elongated element from between said distal ends into said opening when the wrench head is moved across said axis for such engagement.

14. A method of constructing a reinforced wrench head, the method comprising:

obtaining a wrench including a first annulus having axially opposite sides and centrally defining a socket configured for engagement with a prismatic element;

forming a second annulus having an outside diameter corresponding to the outside diameter of said first annulus and having an inside diameter less than the least width of said socket in a direction along a diameter of said first annulus; juxtapositioning one of said axially opposite sides of said first annulus to said second annulus with said first annulus and said second annulus disposed in coaxial relation;

fixedly connecting said one of said axially opposite sides and said second annulus; and forming an opening having a width less than the inside diameter of said second annulus through said first annulus and said annulus.

15. The method of claim 14 wherein, in said step of fixedly connecting said one of said axially opposite sides and said second annulus, said one of said axially opposite sides and said second annulus are connected entirely about the circumference of said second annulus.

* * * * *